United States Patent
Duncan et al.

(10) Patent No.: US 7,081,614 B2
(45) Date of Patent: Jul. 25, 2006

(54) OPTICAL SENSOR SYSTEM WITH BUILT-IN OPTICAL TEST CAPABILITY

(75) Inventors: Jeffrey T. Duncan, Vail, AZ (US);
Benjamin Klaus, Tucson, AZ (US);
Robert J. Schaller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/850,682

(22) Filed: May 21, 2004

(65) Prior Publication Data

US 2005/0258352 A1   Nov. 24, 2005

(51) Int. Cl.
*G01D 18/00* (2006.01)
(52) U.S. Cl. .................................. 250/252.1
(58) Field of Classification Search ............. 250/252.1
See application file for complete search history.

(56) References Cited

U.S. PATENT DOCUMENTS

| | | | |
|---|---|---|---|
| 4,544,843 A | 10/1985 | Kern et al. | |
| 5,323,002 A * | 6/1994 | Sampsell et al. | 250/252.1 |
| 5,466,943 A * | 11/1995 | Green et al. | 250/493.1 |
| 5,532,484 A | 7/1996 | Sweetser et al. | |
| 5,604,346 A | 2/1997 | Hamrelius et al. | |
| 5,798,518 A * | 8/1998 | Coleman et al. | 250/205 |
| 6,020,955 A * | 2/2000 | Messina | 356/138 |
| 6,127,679 A * | 10/2000 | Ashley et al. | 250/252.1 |
| 6,285,021 B1 | 9/2001 | Fayfield | |
| 6,359,681 B1 * | 3/2002 | Housand et al. | 356/4.01 |
| 6,655,778 B1 | 12/2003 | Arquilevich et al. | |

FOREIGN PATENT DOCUMENTS

DE   32 32 956 A1   3/1984

* cited by examiner

*Primary Examiner*—David Porta
*Assistant Examiner*—Marcus Taningco
(74) *Attorney, Agent, or Firm*—Thomas J. Finn, Esq.; John E. Gunther; Karl A. Vick, Esq.

(57) ABSTRACT

An optical sensor system (20) has an optical detector (28) with an active detector area (38) and a detector output signal (40). A test-signal optical source (44) has a controllable optical source (48) having an output of a wavelength detectable by the optical detector (28), and a test-signal director (50) that directs the output of the optical source (48) to the active detector area (38) of the optical detector (28). A housing (22) encloses the optical detector (28) and the test-signal optical source (44). A test instrumentation controller (52) controls the operation of the optical source (48), and receives the detector output signal (40) for evaluation.

22 Claims, 2 Drawing Sheets

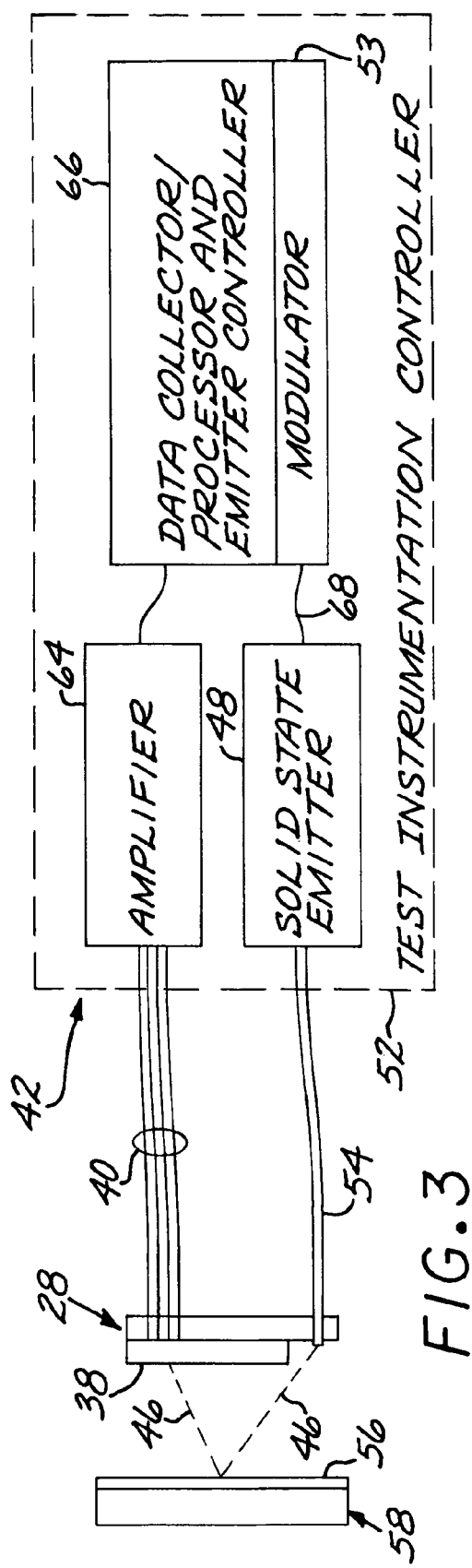
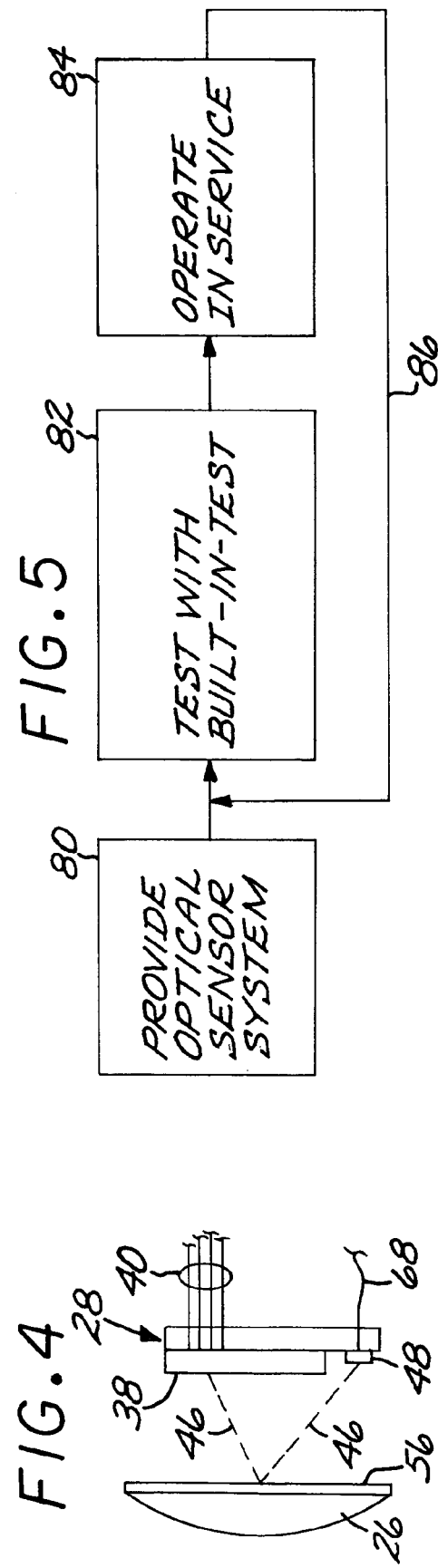

OPTICAL SENSOR SYSTEM WITH BUILT-IN OPTICAL TEST CAPABILITY

This invention relates to an optical sensor system and, more particularly, to an optical sensor system with an optical test capability that is built into and integral with the optical sensor system.

BACKGROUND OF THE INVENTION

An optical sensor system includes an optical detector. Light from a viewed scene is incident upon the optical detector. The optical detector converts the incident light into a signal, typically an electrical signal, that is processed to gain information about the scene. In one important application, the optical detector is an imaging optical detector such as a focal plane array formed of a number of individual detector elements. The incident light is converted to a detector output signal for each of the detector elements, and the plurality of detector output signals are processed to form an electronic image of the scene and analyzed as needed.

The optical sensor system must be capable of being tested to verify that it is functioning properly, at least prior to service and desirably even during service. For the described optical sensor system, one common practice is to inject electrical test signals into the detector output signals of the optical detector. This purely electrical test approach determines whether part of the electrical circuitry and processing electronics are operating properly. However, it does not assess the performance of the portion of the optical detector that converts incident light to the detector output signal and its related structure.

To test the operation of the portion of the optical detector that converts incident light to the detector output signal, the usual approach is to position a known constant or modulated test pattern in the field of view of the optical detector, and to analyze the detector output signals. This approach works well for initial pre-service evaluation and calibration. It is not practical for many service applications, as the test pattern on a card or on a screen must be placed in the view of the optical detector. This placement requires some type of a movable test-pattern structure that may be positioned in front of the optical detector when testing is desired. Such a movable test-pattern structure is not practical or possible for many of the most demanding service applications. In a case of interest, for example, a gun-launched projectile may include an optical sensor system that is desirably tested during the flight phase after the high-acceleration firing of the projectile. The presently available test technology does not permit the in-flight testing of the optical portion of the optical detector.

There is a need for an approach to provide a built-in-test capability for the optical detector and the other systems of the optical sensor system. The present invention fulfills this need, and further provides related advantages.

SUMMARY OF THE INVENTION

The present invention provides an optical sensor system with a built-in, integral test capability for testing the optical detector and the other systems of the optical sensor system. The built-in test allows the testing of both the optical portion of the optical detector that converts incident light to an electrical signal, and also the electrical processing functionality of the optical detector. This approach may be used in initial, pre-service testing and also in in-service testing. Both the pre-service performance and any change in performance of the optical sensor system in service are tested in an identical manner, allowing direct comparisons to be made. The present approach adds very little mass and size to the optical sensor system, and has no moving parts that add weight and are susceptible to failure.

In accordance with the invention, an optical sensor system comprises an optical detector having an active detector area and a detector output signal, and a test-signal optical source. The test-signal optical source includes a controllable optical source having an output of a wavelength detectable by the optical detector, and a test-signal director that directs the output of the optical source to the active detector area of the optical detector. There is preferably a housing in which the optical detector and the test-signal optical source are enclosed. The housing may be, for example, a projectile. A test instrumentation controller controls the operation of the optical source, and receives the detector output signal for evaluation. Preferably, the test instrumentation controller includes a modulator that modulates the output of the controllable optical source.

The optical detector may be an imaging sensor such as a focal plane array. The optical source is preferably a solid state emitter such as a laser or a light emitting diode (LED). The optical source is preferably not within the field of view of the optical detector.

In one embodiment, the test-signal director comprises a reflective surface disposed facing the active detector area. The reflective surface is preferably provided as a semi-transparent reflective surface on an optical element such as a solar filter, a window, or a lens element. An optical fiber directs the output of the optical source toward the semi-transparent reflective surface. The optical source is positioned so that the output of the optical source is reflected by the reflective surface to the active detector area. Desirably, the test-signal director has no moving parts that require actuation when the testing is to be performed.

The present approach provides a built-in-test (BIT), integral test structure for the entire optical detector, including both the optical sensor that converts light to electrical (or other type of processable) signals, and also the processing electronics or other processing capability. The same test capability may be used in both pre-service testing and also testing after the optical sensor system has entered service. Any changes in the performance of the optical sensor system from pre-service to service conditions may be readily determined and evaluated. In the preferred approach, the test structure has no moving parts that must be activated in order to accomplish the test, increasing the reliability of the test structure and also avoiding increases in mass and size of the optical sensor system.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a schematic circuit diagram of the embodiment of the optical sensor system of FIG. 2;

FIG. 4 is a schematic diagram of a portion of a second embodiment of the optical sensor system; and FIG. 5 is a block diagram of a method for performing testing of the optical sensor system according to the present approach.

DETAILED DESCRIPTION OF THE INVENTION

Figure 1:
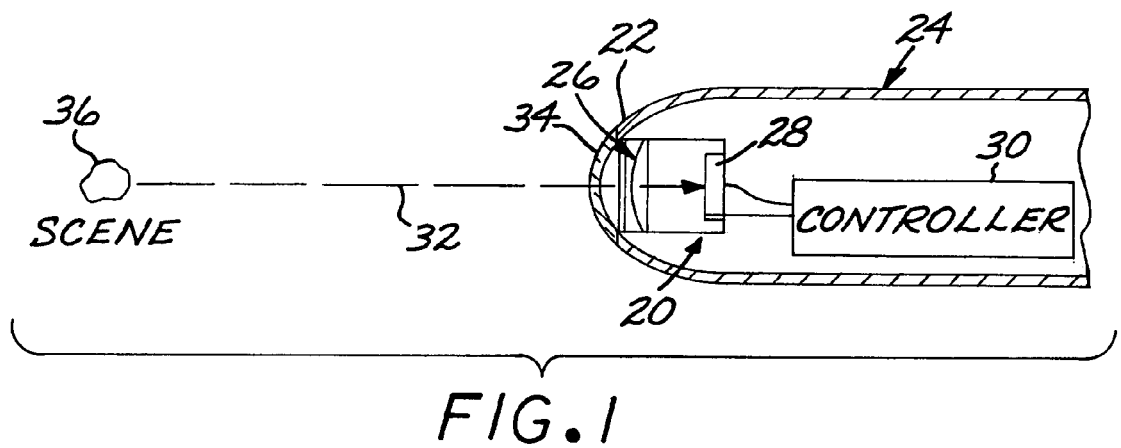
FIG. 1 is a schematic diagram of an optical sensor system and the environment in which it may be used.

FIG. 1 depicts an optical sensor system 20 located within a housing 22, which in the illustrated embodiment is the housing of a projectile 24. The optical sensor system 20 includes optical elements 26, an optical detector 28, and a controller 30. The optical sensor system 20 receives a signal light beam 32 from a scene through a forward-facing window 34 that is one of the optical elements 26, and specifically from an object 36 in the scene. The optical detector 28 converts the signal light beam 32 to an electrical or other processable signal, which is then provided to the controller 32 for processing by techniques such as pattern recognition.

Figure 2:
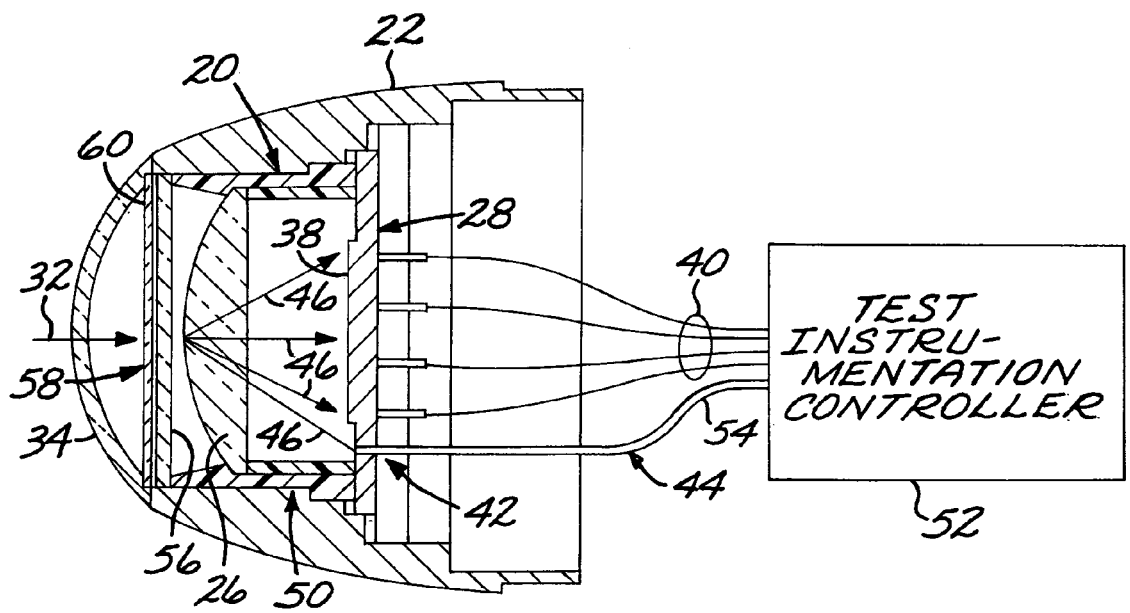
FIG. 2 is schematic diagram of the physical elements of an embodiment of an optical sensor system according to the present approach.

FIG. 2 illustrates the major physical elements of the optical sensor system 20 in greater detail, and FIG. 3 depicts the electronic components and electrical interconnects with the physical elements. The optical sensor system 20 comprises the optical detector 28 having an active detector area 38 and at least one, and typically a plurality of, detector output signals 40. The sensor elements in the active detector area 38 convert incident light rays into electrical signals that form the detector output signals 40. The optical detector 28 may be of any operable type, and is typically an imaging optical detector, such as a focal plane array (FPA), whose output signals 40 may be collectively processed to form an image of the object 36 or a surrogate of an image that is processed to produce useful information about the object 36. The optical detector 28 may instead be a non-imaging sensor, such as a photocell or a small array of photocells, where the detector output signals 40 are not processed to form an image or a surrogate of an image. Whether the optical detector 28 is imaging or non-imaging is not pertinent to the built-in-test structure discussed subsequently. Optical detectors 28 for ultraviolet, visible, and infrared wavelengths and subranges of wavelengths are known in the art.

The optical sensor system 20 includes an integral built-in-test (BIT) structure 42 that allows the optical detector 28 to be tested both for its optical performance and for its electrical performance. The BIT structure 42 includes a test-signal optical source 44 that sends a test light beam 46 to the active detector area 38. The test-signal optical source 44 includes a controllable optical source 48 (FIG. 3) having an output of a wavelength detectable by the active detector area 38 of the optical detector 28. The optical source 48 is preferably a small-size solid state emitter such as a laser or a light-emitting diode (LED) or the like.

The test-signal optical source 44 also includes a test-signal director 50 that directs the output of the optical source 48 to the active detector area 38 of the optical detector 28. The optical source 48 may be placed immediately adjacent to the optical detector 28, either in or out of the field of view of the active detector area 38, so that the test-signal director 50 may be simply a mount, a focusing device, or an aperture that directs the output of the optical source to become the test light beam 46. In one embodiment illustrated in FIGS. 2–3, the optical source 48 is mounted separately from the optical detector 28, as part of a test instrumentation controller 52 that is in turn part of the controller 30. In that case, the test-signal director 50 may include an optical fiber 54 that conducts the output of the optical source 48 to the required location, and aims the output in the required direction, to serve as the test light beam 46. In an alternative approach, the optical source 48 may be mounted on the edge of the optical detector 28 and driven by an electrical signal, as will be discussed subsequently. The optical detector 28 and the test-signal optical source 44 are enclosed in the housing 22.

It is preferred that the optical source 48 and the optical fiber 54, if used, be out of the direct field of view of the active detector area 38. Otherwise, a portion of the field of view of the active detector area 38 is obscured when the optical detector 28 is to be used to observe the scene. In the presently preferred embodiment, the optical source 48 and the optical fiber 54 are placed out of the field of view of the active detector area 38.

To controllably direct the test light beam 46 to the active detector area 38 from the out-of-view optical source 48, the test-signal director 50 includes a reflective surface 56 disposed facing the active detector area 38. The reflective surface 56 may be positioned parallel to the optical detector 28, but it need not be parallel to the optical detector 28. In the embodiment of FIGS. 2–3, the reflective surface 56 intercepts the signal light beam 32. To prevent the blocking of the signal light beam 32, the reflective surface 56 may be a surface of a semi-transparent optical element 58 disposed facing the active detector area 38. Equivalently for the present purposes, the reflective surface 56 may be applied to one of the surfaces of the optical element 26 facing the optical detector 28 or to the inside surface of the window 34.

The optical element 58 is semi-transparent in the sense that it passes the wavelengths of interest of the signal light beam 32, but includes the reflective surface 56 that reflects the wavelength(s) of the test light beam 46. This selectivity may be achieved by making the reflective surface 56 as an angular-selective coating that passes the signal light beam 32 through because it is at or near perpendicular incidence to the reflective surface 56, but reflects the test light beam 46 because the test light beam 46 is incident upon the reflective surface 56 at a sufficiently high angle that it is subject to total reflection. Such angular-selective coatings are known in the art for use in other applications, such as in multiplexers/demultiplexers in optical communications systems. The test-signal director 50 is selected, positioned, and aimed so that the test light beam 46 is incident upon the reflective surface 56 at such a high angle, as shown in FIG. 2. In the illustrated preferred embodiment, the semi-transparent reflective surface 56 is deposited upon an inwardly facing (i.e., toward the optical detector) of a surface of a solar filter 60. The reflective surface 56 may instead be positioned so that it properly reflects the test light beam 46, but is out of the field of view of the scene.

A key feature of the preferred embodiment is that the test-signal director 50, and more generally the entire built-in-test structure 42, has no moving parts. There is no shutter or the like to be opened and closed, or an actuator that must be operated, to effect the shift between a test condition and a monitoring of the scene. This absence of moving parts reduces the size, volume, and weight of the BIT structure 42, and increases its reliability in demanding applications such the placement in the nose of a projectile that experiences thousands of times the acceleration of gravity when it is fired. The absence of a shutter or the like also permits the testing of the optical detector 28 substantially simultaneously with the service monitoring of the scene by the optical detector 28.

The test instrumentation controller 52, a preferred embodiment of which is depicted in greater detail in FIG. 3, controls the operation of the optical source 48. The test instrumentation controller 52 includes a data collector/processor and emitter controller 66 which activates the optical source 48, illustrated as the solid state emitter, through a command signal 68 for testing of the optical detector 28 and associated electronics, and de-activates the optical source 48 when the testing is complete. The data collector/processor and emitter controller 66 may include a modulator 53 that generates the command signal 68 on a periodic or controlled basis.

The test instrumentation controller 52 also receives the detector output signal(s) 40 for data collection and evaluation as needed. In the illustrated embodiment, the detector output signal(s) 40 are provided to an amplifier 64, such as a trans-impedance amplifier. The amplified signals are provided to the data collector/processor and emitter controller 66. The data that is collected in the data collector/processor and emitter controller 66 may be processed and evaluated to determine whether the active detector area 38 is functioning properly, either in real time or subsequently in post-testing evaluation.

FIG. 4 depicts a second embodiment of the present approach. The approach of FIG. 4 is like that of FIGS. 2–3, except as noted next, and the description of FIGS. 2–3 is incorporated here to the extent applicable. In the embodiment of FIG. 4, the optical source 48 is mounted integrally with the structure of the optical detector 28 so that the test light beam 46 is emitted directly from the optical source 48, and there is no need for the optical fiber 54. The optical source 48 may instead be freestanding and not affixed to the optical detector 28, but still producing the test light beam 46. In this embodiment, the reflective surface 56 is applied to the surface of the optical lens element 26 facing the active detector area 38, and there is no need for the separate semi-transparent optical element 58 (except to support the solar filter 60 where used). These alternative embodiments may be used together or with compatible elements of the embodiment of FIGS. 2–3 in any operable combination.

FIG. 5 depicts a method for performing testing of the optical sensor system 20 according to the present approach. The optical sensor system 20 as described herein is provided, step 80. The built-in-test structure 42 is operated to test the optical detector 28, step 82, and the optical detector 28 is operated in its normal detection mode, step 84. The steps 82 and 84 are depicted as being serial, but they may be performed simultaneously in the sense that the built-in-test system is periodically operated at the same time that the optical detector 28 continues its normal operation. The ability to perform this simultaneously service operation and testing was verified in the reduction to practice described subsequently. The testing 82 and service operation 84 are repeated as needed, step 86.

The present invention using the embodiment of FIGS. 1–3 and 5 has been reduced to practice by firing the optical sensor system 20 in a 120 millimeter mortar projectile in which the projectile and the optical system were subjected to a shock loading of 5440 G (5440 times the acceleration of gravity) at firing. The solid state emitter 48 was a low-power IR laser diode that illuminated the optical detector 28 with test light pulses at a 2 Hz rate. A ground target was illuminated by a laser, which signal was detected by the optical detector 28 during its service operation in the later stages of the flight of the projectile. The testing of the optical detector 28 by the approach described herein was initiated prior to firing the projectile to establish initial characteristics of the optical detector 28, and continued during the firing and ballistic portions of the flight of the projectile, both before and after acquisition of the ground target, to determine the operating characteristics of the optical detector 28 during flight after experiencing the shock loading of the firing of the projectile. The output signals 40 of the optical detector 28 were recorded and later analyzed after impact of the projectile. The pulses produced by the solid state emitter 48 as well as the signal of the laser-illuminated ground target in the viewed scene were read from the recorded data. The ability of the present approach to produce a readable test signal that could be distinguished from the target signal was thereby established. It was also verified that the test signal produced by the solid state emitter could be read simultaneously with the operation of the optical detector 28 as it performed its primary service function of detecting the target signal in the scene.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical sensor system comprising:
   an imaging optical detector having an active detector area and a detector output signal;
   a test-signal optical source comprising
      a controllable optical source having an output of a wavelength detectable by the optical detector, and
      a test-signal director that directs the output of the optical source to the active detector area of the optical detector, wherein the test-signal director has no moving parts;
   a housing in which the optical detector and the test-signal optical source are enclosed; and
   a test instrumentation controller that
      controls the operation of the optical source, and
      receives the detector output signal for evaluation.

2. The optical sensor system of claim 1, wherein the optical source is a solid state emitter.

3. The optical sensor system of claim 1, wherein the optical source is mounted separately from the optical detector.

4. The optical sensor system of claim 1, wherein the optical source is mounted integrally with the optical detector.

5. The optical sensor system of claim 1, wherein the test-signal director comprises an optical fiber.

6. The optical sensor system of claim 1, wherein the test-signal director comprises
   a reflective surface disposed facing the active detector area.

7. The optical sensor system of claim 1, wherein the test-signal director comprises
   a reflective surface comprising a surface of a semi-transparent optical element disposed facing the active detector area.

8. The optical sensor system of claim 1, wherein the optical source is not within a field of view of the optical detector.

9. An optical sensor system comprising:
   an optical detector having an active detector area and a detector output signal;
   a test-signal optical source comprising
      a semi-transparent reflective surface disposed facing the active detector area, and
      a controllable optical source having an output of a wavelength detectable by the optical detector, wherein the optical source is positioned so that the output of the optical source is reflected by the reflective surface and to the active detector area; and a test instrumentation controller that
controls the operation of the optical source, and
receives the detector output signal for evaluation.

10. The optical sensor system of claim 9, wherein the optical sensor system further includes
a housing in which the optical detector and the test-signal optical source are enclosed.

11. The optical sensor system of claim 9, wherein the semi-transparent reflective surface comprises a surface of a solar filter.

12. The optical sensor system of claim 9, wherein the semi-transparent reflective surface comprises a surface of an optical lens element.

13. The optical sensor system of claim 9, wherein the controllable optical source comprises a laser.

14. The optical sensor system of claim 9, wherein the controllable optical source comprises
a laser or an LED, and
an optical fiber that directs the output of the laser or the LED toward the semi-transparent reflective surface.

15. The optical sensor system of claim 9, wherein the test instrumentation controller comprises
a modulator that modulates the output of the controllable optical source.

16. An optical sensor system comprising:
an optical detector having an active detector area and a detector output signal;
a test-signal optical source comprising
a solar filter having a semi-transparent reflective surface disposed facing the active detector area, and
a controllable optical source having an output of a wavelength detectable by the optical detector, wherein the controllable optical source comprises
a light emitter, and
an optical fiber that directs the output of the laser toward the semi-transparent reflective surface, and
wherein
the optical source is positioned so that the output of the optical source is reflected by the reflective surface and to the active detector area;
a housing in which the optical detector and the test-signal optical source are enclosed; and
a test instrumentation controller that
controls the operation of the optical source, and
receives the detector output signal for evaluation.

17. The optical sensor system of claim 16, wherein the controllable optical source comprises a laser.

18. The optical sensor system of claim 16, wherein the housing is a projectile.

19. An optical sensor system comprising:
an optical detector having an active detector area and a detector output signal;
a test-signal optical source comprising
a controllable optical source having an output of a wavelength detectable by the optical detector, wherein the optical source is mounted integrally with the optical detector, and
a test-signal director that directs the output of the optical source to the active detector area of the optical detector;
a housing in which the optical detector and the test-signal optical source are enclosed; and
a test instrumentation controller that
controls the operation of the optical source, and
receives the detector output signal for evaluation.

20. An optical sensor system comprising:
an optical detector having an active detector area and a detector output signal;
a test-signal optical source comprising
a controllable optical source having an output of a wavelength detectable by the optical detector, and
a test-signal director that directs the output of the optical source to the active detector area of the optical detector, wherein the test-signal director comprises a reflective surface disposed facing the active detector area, and wherein the test-signal director comprises an optical fiber;
a housing in which the optical detector and the test-signal optical source are enclosed; and
a test instrumentation controller that
controls the operation of the optical source, and
receives the detector output signal for evaluation.

21. The optical sensor system of claim 20, wherein the reflective surface comprises a surface of a semi-transparent optical element.

22. An optical sensor system comprising:
an imaging optical detector having an active detector area and a detector output signal;
a test-signal optical source comprising
a controllable optical source having an output of a wavelength detectable by the optical detector, and
a test-signal director that directs the output of the optical source to the active detector area of the optical detector, wherein the test-signal director comprises an optical fiber;
a housing in which the optical detector and the test-signal optical source are enclosed; and
a test instrumentation controller that
controls the operation of the optical source, and
receives the detector output signal for evaluation.

* * * * *